United States Patent
Liu

(10) Patent No.: US 11,989,352 B2
(45) Date of Patent: May 21, 2024

(54) METHOD DISPLAY DEVICE AND MEDIUM WITH LASER EMISSION DEVICE AND OPERATIONS THAT MEET RULES OF COMMON TOUCH

(71) Applicant: SHENZHEN TCL NEW TECHNOLOGY CO., LTD., Guangdong (CN)

(72) Inventor: Zhe Liu, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/006,109

(22) PCT Filed: Jul. 21, 2021

(86) PCT No.: PCT/CN2021/107667
§ 371 (c)(1),
(2) Date: Jan. 19, 2023

(87) PCT Pub. No.: WO2022/017421
PCT Pub. Date: Jan. 27, 2022

(65) Prior Publication Data
US 2023/0280837 A1 Sep. 7, 2023

(30) Foreign Application Priority Data
Jul. 23, 2020 (CN) .......................... 202010720160.9

(51) Int. Cl.
*G06F 3/03* (2006.01)
(52) U.S. Cl.
CPC ................. *G06F 3/0304* (2013.01)

(58) Field of Classification Search
CPC ..................................................... G06F 3/0304
See application file for complete search history.

(56) References Cited

U.S. PATENT DOCUMENTS

| 8,271,906 B1 | 9/2012 | Fong |
| 2004/0178997 A1* | 9/2004 | Gillespie ................. G06F 3/041 |
| | | 345/173 |

(Continued)

FOREIGN PATENT DOCUMENTS

| CN | 102622108 A | 8/2012 |
| CN | 103092432 A | 5/2013 |

(Continued)

OTHER PUBLICATIONS

International Search Report in International application No. PCT/CN2021/107667, dated Oct. 20, 2021.

(Continued)

*Primary Examiner* — Liliana Cerullo
(74) *Attorney, Agent, or Firm* — PV IP PC; Wei Te Chung; Zhigang Ma

(57) ABSTRACT

An interaction method for a display device includes: receiving a laser signal emitted by an emission device, wherein the laser signal is displayed on a laser sensing screen of the display device in at least one laser cursor; obtaining position information of the at least one laser cursor on the laser sensing screen; obtaining operation information transmitted by the emission device; and performing a corresponding operation according to the operation information and the position information of the at least one laser cursor. A display device and a non-transitory storage medium are also provided.

18 Claims, 4 Drawing Sheets

(56) References Cited

U.S. PATENT DOCUMENTS

| | | | | |
|---|---|---|---|---|
| 2016/0139699 A1* | 5/2016 | Barel | ................... | G06F 3/0445 |
| | | | | 345/174 |
| 2016/0370883 A1* | 12/2016 | Narita | ................... | G02B 27/20 |
| 2017/0147097 A1* | 5/2017 | Park | ...................... | G06F 3/0416 |
| 2017/0357336 A1* | 12/2017 | McNeil | ................ | G06F 3/0386 |
| 2019/0369752 A1* | 12/2019 | Ikeda | .................. | G02B 27/017 |

FOREIGN PATENT DOCUMENTS

| | | |
|---|---|---|
| CN | 104166509 A | 11/2014 |
| CN | 112328158 A | 2/2021 |

OTHER PUBLICATIONS

Written Opinion of the International Search Authority in International application No. PCT/CN2021/107667, dated Oct. 20, 2021.

* cited by examiner

(12) United States Patent
US 11,989,352 B2

METHOD DISPLAY DEVICE AND MEDIUM WITH LASER EMISSION DEVICE AND OPERATIONS THAT MEET RULES OF COMMON TOUCH

CROSS REFERENCE TO RELATED APPLICATIONS

This application is a US national phase application based upon an International Application No. PCT/CN2021/107667, filed on Jul. 21, 2021, which claims the priority of Chinese Patent Application No. 202010720160.9, entitled "INTERACTION METHOD, DISPLAY DEVICE, EMISSION DEVICE, INTERACTION SYSTEM, AND STORAGE MEDIUM", filed on Jul. 23, 2020, the contents of which are incorporated herein by reference in their entirety.

TECHNICAL FIELD

The present disclosure relates to the interaction field, and more particularly to an interaction method, a display device, an emission device, an interaction system, and a storage medium.

BACKGROUND ART

With wide applications of current interactive systems, especially non-contact interactive operations, current long distance operations of screen content generally adopt interaction methods such as intelligent voices or gestures.

TECHNICAL PROBLEM

Because a distance of an intelligent voice operation is generally within 5 to 8 meters, recognition accuracy is limited, and a response speed is average. In a method where an external camera is used for capturing and sensing a gesture, learning costs are high, interactive accuracy is low, and a range of a recognition distance is limited. Accordingly, many limitations exist in the above-mentioned long distance interactive operations in many scenarios. In the meantime, because sizes of device screens become larger and larger, costs of large-sized capacitive touch screens are too high. Accordingly, it is urgent to need configurations where high accuracy and long or short distance interactions can be implemented conveniently and efficiently.

TECHNICAL SOLUTION

A main objective of the present disclosure is to provides an interaction method, a display device, an emission device, an interaction system, and a storage medium aiming at solving how to control a screen in a long distance.

In order to achieve the above-mentioned objective, the present disclosure provides an interaction method for a display device. The method includes:
  receiving a laser signal emitted by an emission device, wherein the laser signal is displayed on a laser sensing screen of the display device in at least one laser cursor;
  obtaining position information of the at least one laser cursor on the laser sensing screen;
  obtaining operation information transmitted by the emission device; and
  performing a corresponding operation according to the operation information and the position information of the at least one laser cursor.

Optionally, the obtaining the operation information transmitted by the emission device includes:
  analyzing the laser signal to obtain an operation signal transmitted by the emission device; or
  receiving the operation signal transmitted by the emission device.

Optionally, the performing the corresponding operation according to the operation information and the position information of the at least one laser cursor includes:
  determining whether duration of a first single-time operation in the operation information exceeds a first preset time;
  determining whether adjacent second single-time operation information is obtained within a second preset time of the first single-time operation, when the duration of the first single-time operation does not exceed the first preset time;
  performing a double-click operation, when the adjacent second single-time operation information is obtained within the second preset time of the first single-time operation; and
  performing a single-click operation, when the adjacent second single-time operation information is not obtained within the second preset time of the first single-time operation.

Optionally, the laser sensing screen includes an interactive control area and a non-interactive control area, and the determining whether the duration of the first single-time operation in the operation information exceeds the first preset time further includes:
  determining whether the position information of the at least one laser cursor is changed, when the duration of the operation information exceeds the first preset time;
  performing a long-press operation, when the position information of the at least one laser cursor is not changed;
  determining whether at least one position of the at least one laser cursor is in the interactive control area, when the position information of the at least one laser cursor is changed;
  performing a drag operation, when the at least one position of the at least one laser cursor is in the interactive control area; and
  performing a slide operation, when the at least one position of the at least one laser cursor is not in the interactive control area.

Optionally, before the performing the slide operation, the interaction method further includes:
  obtaining a number of the at least one laser cursor on the laser sensing screen;
  determining a shape of a movement track of the at least one laser cursor and a relative vector of a starting position, when the number of the at least one laser cursor is 1; and
  performing the corresponding operation according to the shape of the movement track of the at least one laser cursor or the relative vector of the starting position.

Optionally, the performing the corresponding operation according to the shape of the movement track of the at least one laser cursor or the relative vector of the starting position includes:
  determining a matching degree between the shape of the movement track of the at least one laser cursor and at least one preset pattern; and
  determining that the shape of the movement track matches the at least one preset pattern and performing the corresponding operation, when the matching degree between the shape of the movement track and the at least one preset pattern is greater than a preset matching threshold.

Optionally, the at least one preset pattern includes a circular pattern, a cross pattern, a greater-than symbol pattern, and a less-than symbol pattern, and the determining that the shape of the movement track matches the at least one preset pattern includes:

performing a pause operation on a target object, when the shape of the movement track matches the circular pattern;

performing a closing operation on the target object, when the shape of the movement track matches the cross pattern;

performing the corresponding operation on a next object adjacent to the target object, when the shape of the movement track matches the greater-than symbol pattern; and performing the corresponding operation on a previous object adjacent to the target object, when the shape of the movement track matches the less-than symbol pattern.

Optionally, the performing the corresponding operation according to the shape of the movement track of the at least one laser cursor or the relative vector of the starting position includes:

determining whether the relative vector of the starting position of the movement track satisfies an included angle range with a horizontal line; and performing the corresponding operation, when the relative vector of the movement track satisfies the included angle range with the horizontal line.

Optionally, when the relative vector of the movement track satisfies the included angle range with the horizontal line, the performing the corresponding operation includes:

performing a right slide operation, when an included angle between the relative vector of the movement track and the horizontal line is within [A, B] or [E, F];

performing an upward slide operation, when the included angle between the relative vector of the movement track and the horizontal line is within (B, C);

performing a left slide operation, when the included angle between the relative vector of the movement track and the horizontal line is within [C, D]; and performing a downward slide operation, when the included angle between the relative vector of the movement track and the horizontal line is within (D, E), wherein $0°≤A<B<C<D<E<F≤360°$.

Optionally, after the obtaining the number of the at least one laser cursor on the laser sensing screen, the interaction method further includes:

selecting changes of two of the at least one laser cursor with largest laser cursor vector changes to perform the corresponding operation, when the number of the at least one laser cursor is two or more.

Optionally, the selecting the changes of the two of the at least one laser cursor with the largest laser cursor vector changes to perform the corresponding operation includes:

performing a zoom-out operation, when a distance between the two of the at least one laser cursor gradually decreases; and performing a zoom-in operation, when the distance between the two of the at least one laser cursor gradually increases.

Optionally, the laser signal includes a laser spot, and the performing the corresponding operation according to the operation information and the position information of the at least one laser cursor includes:

operating a preset shape corresponding to the laser spot to be displayed on the laser sensing screen operation, and controlling content on the laser sensing screen of the display device to perform the corresponding operation.

Optionally, after the performing the corresponding operation according to the operation information and the position information of the at least one laser cursor, the interaction method further includes:

transmitting feedback information to the emission device in a vibration signal after the corresponding operation is completed, so that a user perceives an operation result.

In order to achieve the above-mentioned objective, the present disclosure further provides an interaction method for an emission device. The emission includes a laser emission module. The method includes:

detecting whether laser emission is turned on;

obtaining a user operation signal, when the laser emission is turned on; and converting the obtained user operation signal, loading the converted user operation signal into the laser signal, and transmitting the laser signal to a display device; or Optionally, the method further includes:

obtaining feedback information transmitted by the display device; and performing corresponding vibration according to the feedback information, so that the user perceives the operation result.

In order to achieve the above-mentioned objective, the present disclosure further provides a display device. The display device includes an interactive program. The interactive program is configured to implement the steps in the above-mentioned interaction methods.

In order to achieve the above-mentioned objective, the present disclosure further provides an emission device. The emission includes an interactive program. The interactive program is configured to implement the steps in the above-mentioned interaction methods.

In order to achieve the above-mentioned objective, the present disclosure further provides an interaction system. The interaction system includes the above-mentioned display device and the above-mentioned emission device.

In order to achieve the above-mentioned objective, the present disclosure further provides a storage medium. The storage medium includes an interactive program. The interactive program is executed by a processor to implement the steps in the above-mentioned interaction methods.

ADVANTAGEOUS EFFECTS

In the interaction method provided by the present embodiment, the operation information transmitted by the emission device and the position information of the at least one laser cursor emitted on the laser sensing screen by the emission device are obtained. The corresponding control operation is responded according to the operation signal and the position information of the at least one laser cursor. The control operation is displayed in a matched shape corresponding to a laser spot and is configured to control content on the laser sensing screen of the display device. The control operation is responded according to the user's operation in combination with the change of the position information of the at least one laser cursor on the laser sensing screen corresponding to the laser signal. The content is positioned accurately through the laser signal. Accuracy and sensitivity of the controlled content are enhanced, thereby realizing high-efficient, convenient, and accurate interactions in a long distance and a short distance.

Furthermore, the laser operation track performed by the user meets rules of common touch operations and conforms to the user's cognitive habits, thereby reducing learning costs.

Implementations of the objectives, functional characteristics and advantages of the present disclosure will further be described in combination with embodiments and with reference to accompanying drawings.

DETAILED DESCRIPTION OF EMBODIMENTS

It should be understood that specific embodiments described herein are merely used for explaining the present disclosure and are not intended to limit the present disclosure.

Main solutions of embodiments of the present disclosure are described as follows.

Long distance operations of screen content in the prior art generally adopt interaction methods such as intelligent voices or gestures. Because a distance of an intelligent voice operation is generally within 5 to 8 meters, recognition accuracy is limited, and a response speed is average. In a method where an external camera is used for capturing and sensing a gesture, learning costs are high, interactive accuracy is low, and a range of a recognition distance is limited. Accordingly, many limitations exist in the above-mentioned long distance interactive operations in many scenarios.

In a solution provided by the present disclosure, an operation signal transmitted by an emission device and at least one change of at least one laser cursor emitted by the emission device on a laser sensing interactive screen, a corresponding control operation is responded according to the operation signal and the at least one change of the at least one cursor. The control operation is displayed in a corresponding shape of a laser spot and is configured to control content on the laser sensing interactive screen of the display device, thereby solving the technical problems that the recognition accuracy is limited, the response speed is average, the learning costs are high, and the range of the recognition distance is limited during an interactive process.

Figure 1:
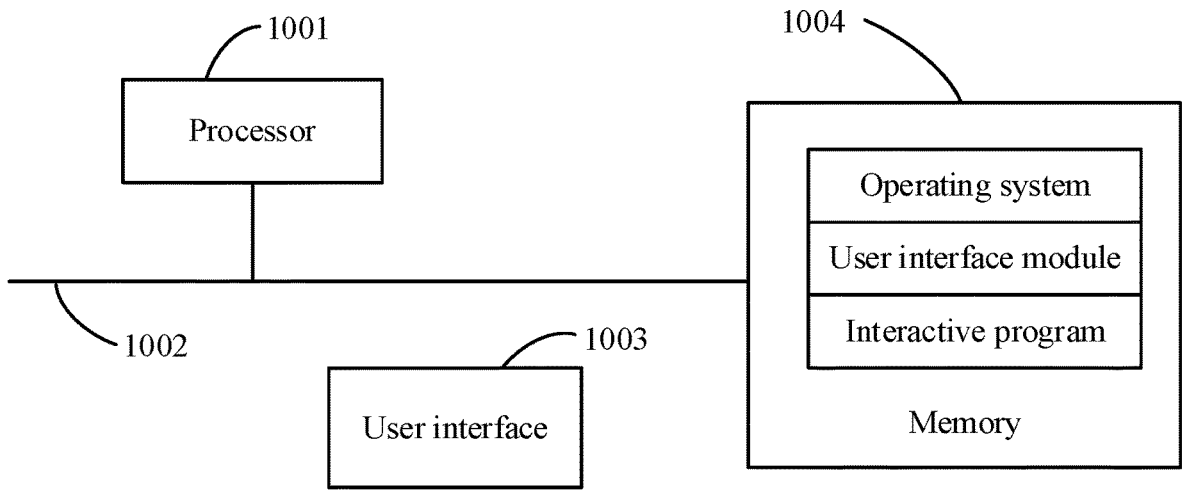
FIG. 1 illustrates a schematic diagram of a hardware operating environment in a structure of a terminal involved in a solution of an embodiment of the present disclosure.

As shown in FIG. 1, FIG. 1 illustrates a schematic diagram of a hardware operating environment in a structure of a terminal involved in a solution of an embodiment of the present disclosure.

As shown in FIG. 1, a display device can include a processor 1001 (such as a CPU), a communication bus 1002, a user interface 1003, and a memory 1004. The display device can further include a laser sensing module (a laser sensing display screen in general) configured to receive a laser signal, a processing module configured to identify a change of a laser position, and a control module configured to transmit information. The screen for receiving laser sensing is simulated as a two-dimensional coordinate system. A bottom left corner is set as an origin (0, 0). An X-axis and a Y axis are positioned at a bottom end and a left end of the laser sensing display screen, respectively. The communication bus 1002 is configured to realize connections and communications of these components. The user interface 1003 can be an infrared receiving module for receiving a control instruction triggered by a user through a remote controller. Optionally, the user interface 1003 can include a standard wired interface or a wireless interface. The memory 1004 can be a high-speed RAM memory or can be a non-volatile memory, such as a disk memory. Optionally, the memory 1004 can also be a storage device independent of the above-mentioned processor 1001.

Those skilled in the art can understand that the structure shown in FIG. 1 does not constitute a limitation to the present disclosure, can include more or fewer components than those shown in FIG. 1, can combine some components, or can have a different configuration of the components.

As shown in FIG. 1, the memory 1004 served as a computer storage medium can include an operating system, a network communication module, a user interface module, and an interactive program.

In the terminal shown in FIG. 1, the user interface 1003 is mainly configured to connect to a client terminal (a user terminal) and perform data communication with the client terminal. The processor 1001 can be configured to call the interactive program stored in the memory 1004 to execute the following operations:

receiving a laser signal emitted by an emission device, wherein the laser signal is displayed on a laser sensing screen of the display device in at least one laser cursor;

obtaining position information of the at least one laser cursor on the laser sensing screen;

obtaining operation information transmitted by the emission device; and performing a corresponding operation according to the operation information and the position information of the at least one laser cursor.

Further, the processor 1001 can be configured to call the interactive program stored in the memory 1004 to further execute the following operations:

analyzing the laser signal to obtain an operation signal transmitted by the emission device; alternatively receiving the operation signal transmitted by the emission device.

Further, the processor 1001 can be configured to call the interactive program stored in the memory 1004 to further execute the following operations:

determining whether duration of a first single-time operation in the operation information exceeds a first preset time;

determining whether adjacent second single-time operation information is obtained within a second preset time of the first single-time operation, when the duration of the first single-time operation does not exceed the first preset time;

performing a double-click operation, when the adjacent second single-time operation information is obtained within the second preset time of the first single-time operation; and performing a single-click operation, when the adjacent second single-time operation information is not obtained within the second preset time of the first single-time operation.

Further, the processor 1001 can be configured to call the interactive program stored in the memory 1004 to further execute the following operations:

determining whether the position information of the at least one laser cursor is changed, when the duration of the operation information exceeds the first preset time;

performing a long-press operation, when the position information of the at least one laser cursor is not changed;

determining whether at least one position of the at least one laser cursor is in an interactive control area, when the position information of the at least one laser cursor is changed;

performing a drag operation, when the at least one position of the at least one laser cursor is in the interactive control area; and performing a slide operation, when the at least one position of the at least one laser cursor is not in the interactive control area.

Further, the processor 1001 can be configured to call the interactive program stored in the memory 1004 to further execute the following operations:

obtaining a number of the at least one laser cursor on the laser sensing screen;

determining a shape of a movement track of the at least one laser cursor and a relative vector of a starting position, when the number of the at least one laser cursor is 1; and performing the corresponding operation according to the shape of the movement track of the at least one laser cursor or the relative vector of the starting position.

Further, the processor 1001 can be configured to call the interactive program stored in the memory 1004 to further execute the following operations:

determining a matching degree between the shape of the movement track of the at least one laser cursor and at least one preset pattern; and determining that the shape of the movement track matches the at least one preset pattern and performing the corresponding operation, when the matching degree between the shape of the movement track and the at least one preset pattern is greater than a preset matching threshold.

Further, the processor 1001 can be configured to call the interactive program stored in the memory 1004 to further execute the following operations:

performing a pause operation on a target object, when the shape of the movement track matches a circular pattern;

performing a closing operation on the target object, when the shape of the movement track matches a cross pattern;

performing the corresponding operation on a next object adjacent to the target object, when the shape of the movement track matches a greater-than symbol pattern; and performing the corresponding operation on a previous object adjacent to the target object, when the shape of the movement track matches a less-than symbol pattern.

Further, the processor 1001 can be configured to call the interactive program stored in the memory 1004 to further execute the following operations:

determining whether the relative vector of the starting position of the movement track satisfies an included angle range with a horizontal line; and performing the corresponding operation, when the relative vector of the movement track satisfies the included angle range with the horizontal line.

Further, the processor 1001 can be configured to call the interactive program stored in the memory 1004 to further execute the following operations:

performing a right slide operation, when an included angle between the relative vector of the movement track and the horizontal line is within [A, B] or [E, F];

performing an upward slide operation, when the included angle between the relative vector of the movement track and the horizontal line is within (B, C);

performing a left slide operation, when the included angle between the relative vector of the movement track and the horizontal line is within [C, D]; and performing a downward slide operation, when the included angle between the relative vector of the movement track and the horizontal line is within (D, E), wherein $0°≤A<B<C<D<E<F≤360°$.

Further, the processor 1001 can be configured to call the interactive program stored in the memory 1004 to further execute the following operation:

selecting changes of two of the at least one laser cursor with largest laser cursor vector changes to perform the corresponding operation, when the number of the at least one laser cursor is two or more.

Further, the processor 1001 can be configured to call the interactive program stored in the memory 1004 to further execute the following operations:

performing a zoom-out operation, when a distance between the two of the at least one laser cursor gradually decreases; and performing a zoom-in operation, when the distance between the two of the at least one laser cursor gradually increases.

Further, the processor 1001 can be configured to call the interactive program stored in the memory 1004 to further execute the following operation:

operating a preset shape corresponding to a laser spot to be displayed on the laser sensing screen, and controlling content on the laser sensing screen of the display device to perform the corresponding operation.

Further, the processor 1001 can be configured to call the interactive program stored in the memory 1004 to further execute the following operation:

transmitting feedback information to the emission device in a vibration signal after the corresponding operation is completed, so that a user perceives an operation result.

Meanwhile, when being applied to the emission device, the processor 1001 can be configured to call the interactive program stored in the memory 1004 to further execute the following operations:

detecting whether laser emission is turned on;
obtaining a user operation signal, when the laser emission is turned on; and
converting the obtained user operation signal, loading the converted user operation signal into the laser signal, and transmitting the laser signal to the display device; or transmitting the obtained user operation signal to the display device in an infrared encoded signal.

Further, the processor 1001 can be configured to call the interactive program stored in the memory 1004 to further execute the following operations:

obtaining the feedback information transmitted by the display device; and
performing corresponding vibration according to the feedback information, so that the user perceives the operation result.

Specific embodiments of the display device, the emission device, and an interaction system of the present disclosure are basically the same as the following embodiments of interaction methods and are not repeated herein.

Figure 2:
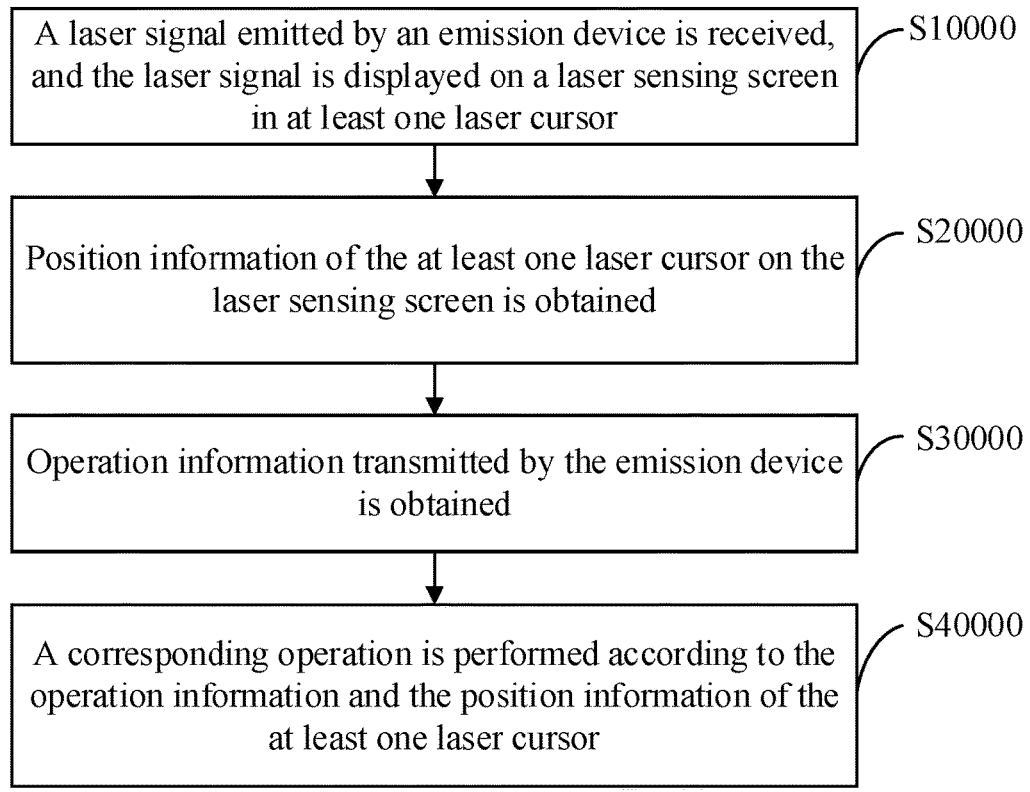
FIG. 2 illustrates a logic flow diagram of an interaction method based on a display device provided by the present disclosure.

Referring to FIG. 2, a logic flow diagram of an interaction method based on a display device is provided by the present disclosure and applied to the display device. The method includes the following steps.

In step S10000, a laser signal emitted by an emission device is received, and the laser signal is displayed on a laser sensing screen in at least one laser cursor.

In addition to the structure shown in FIG. 1, the display device in the present embodiment further includes a laser receiving system for receiving and processing a laser signal. The display device includes a laser sensing screen and further includes a receiving module which is paired and connected with the emission device. A connection method includes infrared encoding pairing. The emission device includes a device with a laser emission function, such as a laser controller, a laser pointer or the like. The display device is a device including a laser sensing module. The display device includes the laser sensing screen. Since a laser has characteristics of monochromaticity, good coherence, good directionality, and high brightness, the laser not only can be used in a short distance, but also can maintain certain stability when being used in a long distance. A color of the laser can be changed according to actual requirements. The laser sensing screen of the display device receives the laser signal emitted by the emission device, and the laser signal displayed on the laser sensing screen is composed of laser spots with different forms centered on the at least one laser cursor and surrounding the at least one laser cursor. The laser spots have different shapes when being applied to different applications or different scenarios in applications of the present disclosure.

In step S20000, position information of the at least one laser cursor on the laser sensing screen is obtained.

In the present embodiment, when the emission device changes an emission angle or direction of the laser signal, the position of the at least one laser cursor corresponding to the laser signal displayed on the sensing screen is also changed accordingly. The laser sensing module of the display device receives the laser signal and feeds back a coordinate position of the at least one laser cursor to the display device. Therefore, the laser sensing module can timely transmit the relevant position information and a position change from the laser sensing module to a processing module of the display device for analysis and processing.

In step S30000, operation information transmitted by the emission device is obtained.

In the present embodiment, obtaining the operation information transmitted by the emission device includes: analyzing the laser signal to obtain an operation signal transmitted by the emission device. A user transmits target operation information through a physical button of the emission device. The operation signal is converted into an electrical signal by a receiving module in the emission device. Then, the electrical signal is re-encoded to load the operation information into the laser signal, so that the user's operation signal can be transmitted through the laser. After the laser receiving system of the display device receives the laser signal carrying the operation signal, the operation signal is obtained by analyzing the laser signal. Real-time transmission of the operation signal from the user's button is realized. The transmitted operation signal includes a single-click operation, a double-click operation, or a long-press operation.

As another embodiment, obtaining the operation information transmitted by the emission device in the present embodiment includes: receiving the operation signal transmitted by the emission. In transmission of the operation signal, the operation signal is converted into an electrical signal by the receiving module of the emission device first. Then, the electrical signal is encoded and modulated by infrared modulation or wireless frequency modulation or amplitude modulation. The encoded and modulated signal is converted into a wireless signal and then transmitted. The receiving system of the display device receives a radio wave carrying the information, and then amplifies and decodes the radio wave to obtain the original operation signal. Real-time transmission of the operation signal from the user's button is realized. The transmitted operation signal includes a single-click operation, a double-click operation, or a long-press operation.

In step S40000, a corresponding operation is performed according to the operation information and the position information of the at least one laser cursor.

In the present embodiment, the operation signal obtained according to the analysis or the received operation signal is combined with the position information of the at least one laser cursor and a relevant position change from the laser sensing module, thereby realizing execution the of different operations. The different operations correspond to different shapes of laser spots, so that the user intuitively understands a specific operation to increase control efficiency.

In the interaction method provided by the present embodiment, the operation information transmitted by the emission device and the position information of the at least one laser cursor emitted on the laser sensing screen by the emission device are obtained. The corresponding control operation is responded according to the operation signal and the position information of the at least one laser cursor. The control operation is displayed in a matched shape corresponding to a laser spot and is configured to control content on the laser sensing screen of the display device. The control operation is responded according to the user's operation in combination with the change of the position information of the at least one laser cursor on the laser sensing screen corresponding to the laser signal. The content is positioned accurately through the laser signal. Accuracy and sensitivity of the controlled content are enhanced, thereby realizing high-efficient, convenient, and accurate interactions in a long distance and a short distance.

Figure 3:
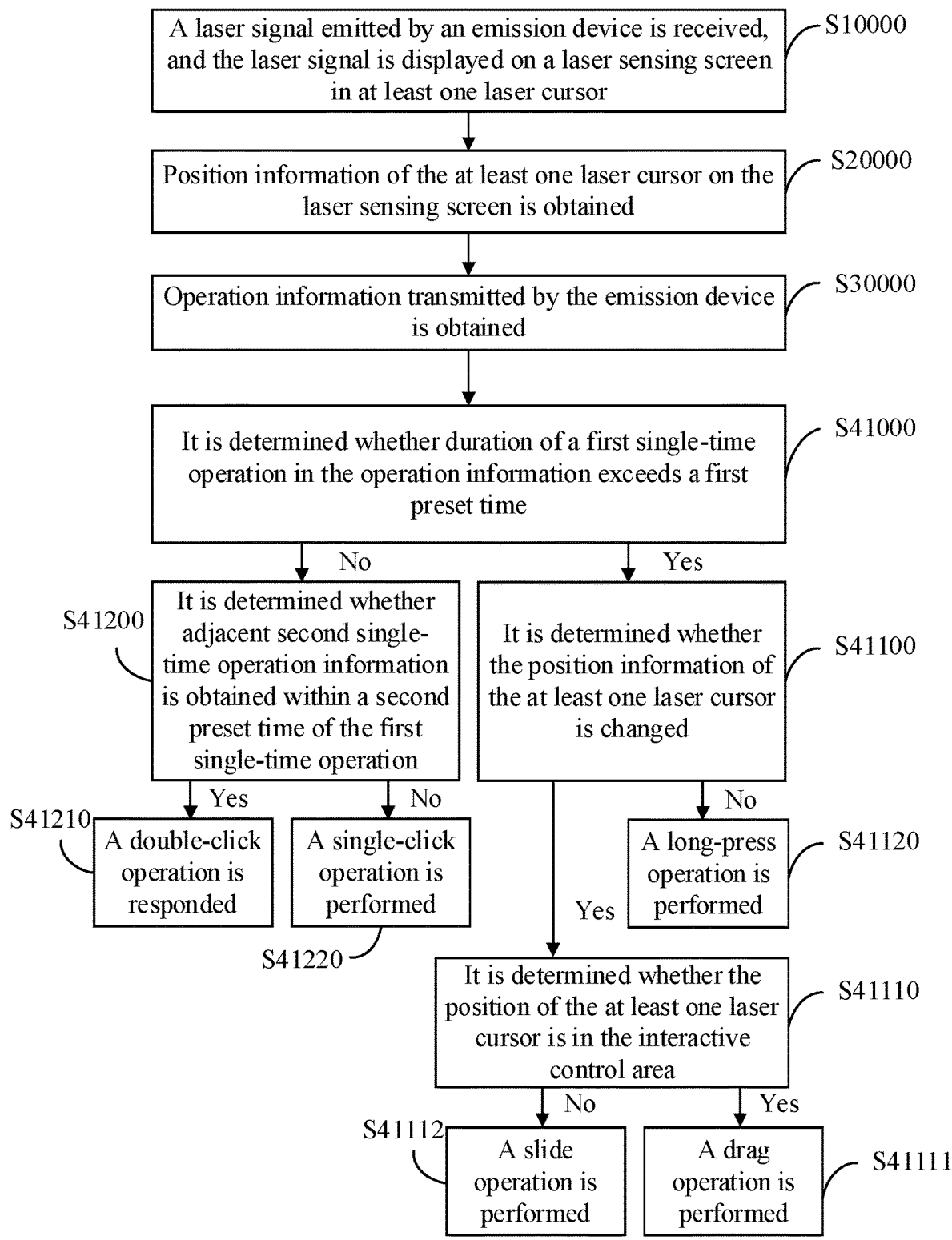
FIG. 3 illustrates a logic flow diagram of a single-click interaction, a double-click interaction, a drag interaction, a long-press interaction, and a slide interaction in an interaction method provided by the present disclosure.

Further, referring to FIG. 3, a logic flow diagram of a single-click interaction, a double-click interaction, a drag interaction, a long-press interaction, and a slide interaction in an interaction method is provided by the present disclosure. Based on the above-mentioned embodiment shown in FIG. 2, the operation of performing the corresponding operation according to the operation information and the position information of the at least one laser cursor includes the following steps.

In step S41000, it is determined whether duration of a first single-time operation in the operation information exceeds a first preset time.

In the present embodiment, the display device determines whether the duration of the first single-time operation in the operation information exceeds the first preset time by comparing the first single-time operation in the operation information with the first preset time.

In step S41200, when the duration of the first single-time operation does not exceed the first preset time, it is determined whether adjacent second single-time operation information is obtained within a second preset time of the first single-time operation. For example, it is assumed that the first preset time is 1 second, the second preset time is 0.5 seconds, and the duration of the first single-time operation is 0.6 seconds. Since the first single-time operation (0.6 seconds) is less than the first preset time (1 second), it is necessary to determine whether a new operation signal is received within the second preset time (0.5 seconds).

In step S41210, when the adjacent second single-time operation information is obtained within the second preset time of the first single-time operation, a double-click operation is responded.

In the present embodiment, when the time of the received first single-time operation does not exceed the first preset time, it is necessary to continue to determine whether the adjacent second single-time operation information exists within the second preset time. If yes, it means that the operation transmitted by the user within the second preset time includes two consecutive clicks. After receiving the double-click operation signal, the display device performs the double-click operation in real time. The double-click operation has differences in different scenarios. For example, in a wake-up scenario, when the laser sensing screen goes to sleep, the double-click operation can quickly wake up and activate the laser sensing screen, so as to achieve a normal interaction. Sleep time can be set based on an actual situation. In a zoom scenario, such as a map application, an original image scale can be zoomed in by the double-click operation. In a blank area where the at least one laser cursor is located, feedback of the double-click operation is empty, and the display device still performs the double-click operation.

In step S41220, when the adjacent second single-time operation is not obtained within the second preset time of the first single-time operation, a single-click operation is performed.

In the present embodiment, when no new operation information is obtained within the second preset time after the first single-time operation signal is obtained, it means that the user only performs a single-click operation. After receiving the single-click operation signal, the display device can respond to implement an operation in real time, such as a content selection, confirmation, playback or the like. Shapes of different laser spots are responded, according to matching logic of different applications, to perform responded functions. Under the premise that the at least one laser cursor is displayed on the laser sensing screen, feedback of the single-click operation is empty in a blank area where the at least one laser cursor is located. The display device still responds to the single-click interaction.

In the method including the single-click interaction and the double-click interaction provided by the present embodiment, the at least one laser cursor moves freely on the sensing screen. According to different scenarios, a control operation is performed according to the user's operation in combination with the change of the position information of the at least one laser cursor on the laser sensing screen corresponding to the laser signal. Types of operations performed by the user meet rules of common touch operations and conform to the user's cognitive habits, thereby reducing learning costs. Furthermore, the content can be positioned accurately through the laser signal. Accuracy and sensitivity of the controlled content are enhanced, thereby realizing high-efficient, convenient, and accurate interactions in a long distance and a short distance.

Furthermore, during the time period where the emission device does not transmit operation information, when the at least one cursor corresponding to the laser signal is in an interactive control area, display effect of a focus activation state of an interactive space is realized. After the at least one laser cursor moves to one control, content displayed by the display device is enlarged by 25%, and a shape of a light spot is also changed to a certain extent. Generally, a more intuitive and eye-catching way is used for informing the user of an area of a current interactive focus. For example, the laser spot is represented by a more eye-catching color. When being located in a non-interactive control area, the laser signal is displayed on the sensing screen only in a form of a laser cursor.

Further, referring to FIG. 3, a logic flow diagram of a long-press interaction, a drag interaction, and a slide interaction in an interaction method is provided by the present disclosure. Based on the above-mentioned embodiment shown in FIG. 2, the laser sensing screen includes an interactive control area and a non-interactive control area. Determining whether the duration of the first single-time operation in the operation information exceeds the first preset time includes the following steps.

In step S41100, when the duration of the first single-time operation in the operation information exceeds the first preset time, it is determined whether the position information of the at least one laser cursor is changed.

In step s41120, when the position information of the at least one laser cursor is not changed, a long-press operation is performed.

In the present embodiment, after the duration of the first single-time operation exceeds the first preset time (for example, the preset first preset time is 1 second), it is considered that this single-time operation is a long press. In the meantime, coordinate information of the at least one laser cursor on the laser sensing screen is not changed. At this time, an outer circle of the at least one laser cursor is displayed as a preset long-press light spot, and the long-press operation is performed on the content indicated by the at least one cursor. Depending on content of different scenarios on the display screen, the long-press operation can achieve different functions including re-evoking of a function menu, a quick response operation and so on. In an evoking scenario, for example, during playback of a mapping screen, a long-press operation can open a setting menu item to perform a further operation of a secondary menu including a playback rate, a subtitle, a screenshots and so on. In a quick response operation scenario, for example, in a map application, a map can be quickly zoomed out by performing a long-press operation on "-" icon.

In step S41110, when the position information of the at least one laser cursor is changed, it is determined whether the position of the at least one laser cursor is in the interactive control area.

In step S41111, when the position of the at least one laser cursor is in the interactive control area, a drag operation is performed.

In the present embodiment, according to the change of the spatial position information of the emission device, the change of the coordinate of the at least one laser cursor projected on the laser sensing screen is obtained. When the coordinate of the at least one projected laser cursor is changed, it is further determined whether the position of the at least one laser cursor is in the interactive control area. The interactive area refers to a display area where an interactive control, such as a menu interface button, a Tab, a hyperlink, and a clickable interactive icon and so on, is located. When the position of the at least one laser cursor is changed in the interactive control area, a movement track is generated. A movement of target content can be realized by moving the coordinate of the at least one laser cursor from an initial position to a target position. For example, an application software in a television menu is dragged from one area to another position. A frequently concerned page in a television interface is dragged to a first screen for display, and a position can be adjusted freely. Alternatively, in a high-efficient browsing device with 3D content, such as a 3D globe, map information of a target area can be reached quickly and easily by simulating rotation of the globe.

In step S41112, when the position of the at least one laser cursor is not in the interactive control area, a slide operation is performed.

In the present embodiment, according to the change of the spatial position information of the emission device, the change of the coordinate of the at least one laser cursor projected on the laser sensing screen is obtained. When the coordinate of the at least one projected laser cursor is changed (that is, the position of the at least one laser cursor is changed in the non-interactive control area), a movement track is generated. The coordinate of the at least one laser cursor is moved from an initial position to a target position, and the corresponding operation is performed according to the movement of the laser. In the present disclosure, a displacement operation where the position of the at least one laser cursor is changed in the non-interactive control area is defined as the slide operation. In different applications, functions implemented by the slide operation are different. Specifically, the slide operation includes an air drawing, a track response and so on. For different applications, corresponding changes are generated. For example, after entering an air drawing app, a drawing operation is responded. In other applications, a track operation is performed.

In the method including the long-press interaction, the drag interaction, and the slide interaction provided by the present embodiment, the long-pressing operation realizes the functions including as a waking up function or a quick execution operation for specific software. The drag and slide operations are configured to control, based on the change of the spatial position information of the emission device, the at least one laser cursor to generate the corresponding movement track on the sensing screen, thereby realizing the function of moving the target content to the target position. The laser operation performed by the user meets rules of common touch operations and conforms to the user's cognitive habits, thereby reducing learning costs. Furthermore, the content can be positioned accurately through the laser signal. Accuracy and sensitivity of the controlled content are enhanced, thereby realizing high-efficient, convenient, and accurate interactions in a long distance and a short distance.

Figure 4:
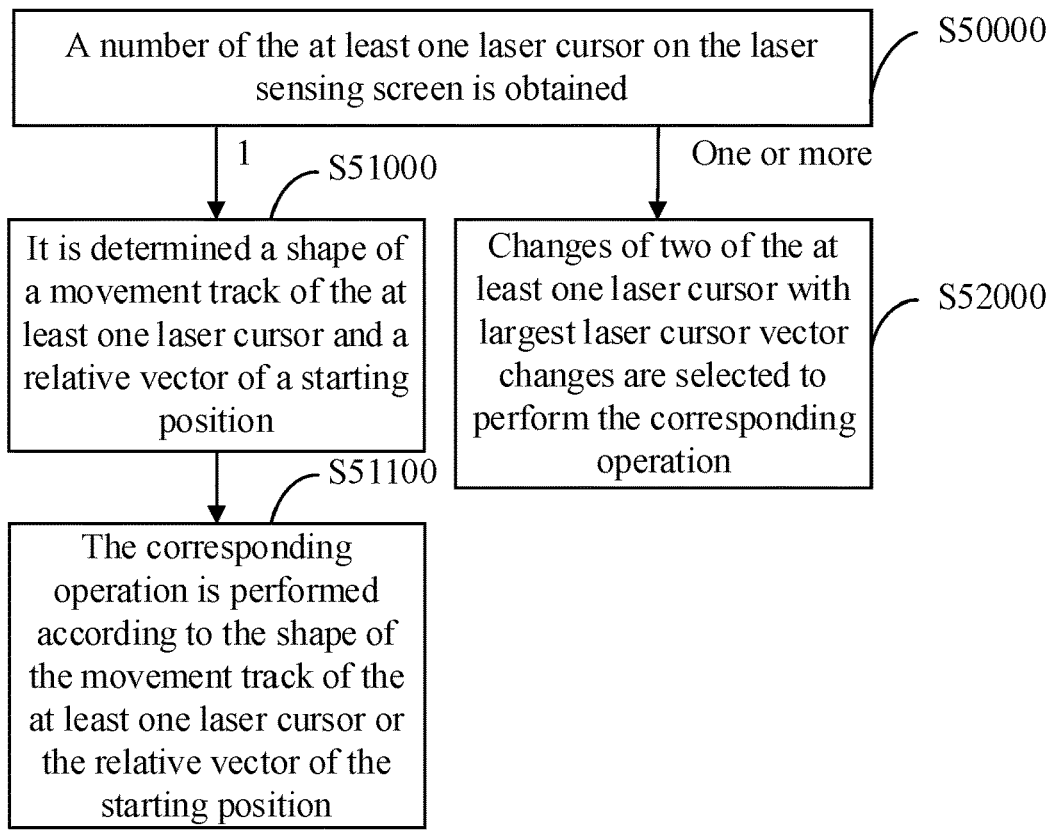
FIG. 4 illustrates a logic flow diagram of a gesture interaction in an interaction method provided by the present disclosure.

Further, referring to FIG. 4, a logic flow diagram of a gesture interaction in an interaction method is provided by the present disclosure. Based on the above-mentioned embodiments shown in FIG. 2 and FIG. 3, before the slide operation is performed, the method further includes the following steps.

In step S50000, a number of the at least one laser cursor on the laser sensing screen is obtained.

In step S51000, when the number of the at least one laser cursor is 1, it is determined a shape of a movement track of the at least one laser cursor and a relative vector of a starting position.

In step S51100, the corresponding operation is performed according to the shape of the movement track of the at least one laser cursor or the relative vector of the starting position.

In the present embodiment, the display device with the laser sensing screen can be paired with multiple emission devices. Accordingly, when a control operation is required to be performed through a gesture interaction, at least one laser signal (that is, the number of the at least one laser cursor) on the laser sensing screen is required to be obtained. When the obtained number of the at least one laser cursor is 1, the user can long press an operation button of the emission device. When the at least one laser cursor is in the non-interactive control position, the user changes the position of the at least one laser cursor projected on the laser sensing screen by changing the spatial position of the emission device. The movement track formed by the movement can be obtained and recognized by the display device. A specific track type can be determined by determining the shape of the movement track and the relative vector of the starting position of the at least one laser cursor. The track type which can be responded includes a movement track with a fixed pattern and a movement track with a starting direction, thereby realizing a situation that a preset pattern and a direction are matched to perform the corresponding operation.

In the gesture interaction method with a single laser controller provided by the present embodiment, the specific movement type is determined by determining, through the movement track generated by the movement of the at least one laser cursor, the shape of the movement track and the relative vector of the starting position of the at least one laser cursor, thereby realizing the situation that the preset pattern and the direction are matched to perform the corresponding operation.

Figure 6:
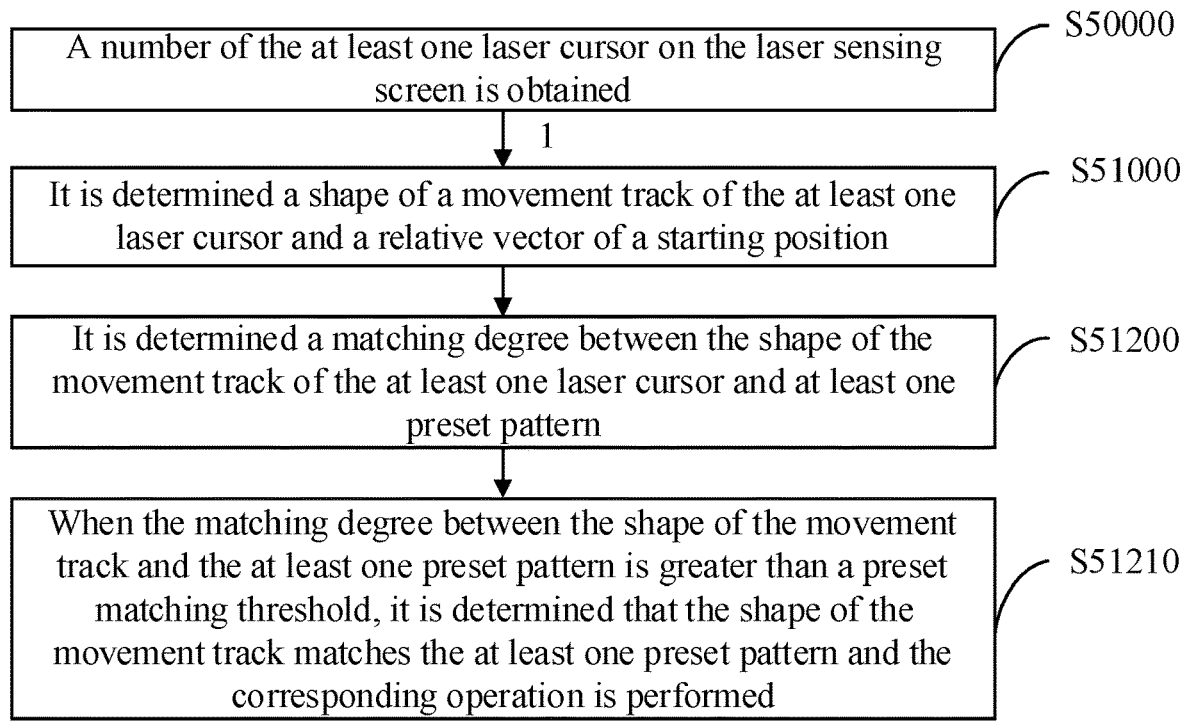
FIG. 6 illustrates a logic flow diagram of a gesture interaction with a fixed track in an interaction method provided by the present disclosure.

Further, referring to FIG. 6, a logic flow diagram of a gesture interaction with a fixed track in an interaction method is provided by the present disclosure. Based on the above-mentioned embodiment shown in FIG. 4, performing the corresponding operation according to the shape of the movement track or the relative vector of the starting position includes the following steps.

In step S51200, it is determined a matching degree between the shape of the movement track of the at least one laser cursor and at least one preset pattern.

In step S51210, when the matching degree between the shape of the movement track and the at least one preset pattern is greater than a preset matching threshold, it is determined that the shape of the movement track matches the at least one preset pattern and the corresponding operation is performed.

In the present embodiment, the display device pre-stores a circular pattern, a cross pattern, a greater-than symbol pattern, and a less-than symbol pattern used for responding to corresponding interactions. The movement track is generated by moving the at least one laser cursor by the user. A system pre-determines a matching degree between a pattern of the track and at least one preset pattern pre-stored in the display device. The matching degree is obtained by determining similarity between the pattern of the track and the at least one preset pattern. Generally, the preset matching threshold is greater than 60%. When the matching degree between the shape of the movement track and the preset pattern is greater than 60%, the corresponding interaction can be realized. In a case that the preset matching threshold is met, the corresponding operation is performed according to the pattern formed by the movement track of the at least one laser cursor. That is, when the shape of the movement track matches the cross pattern, a close operation is performed on a target object. In the present embodiment, a close operation, a zoom-in operation, and a zoom-out operation are all performed on the target object. The target object is an operation object in the current display screen selected by the user, such as a picture or a video being played. When the shape of the movement track matches the greater-than symbol pattern, the corresponding operation is performed on a next object adjacent to the target object. The next object adjacent to the target object corresponds to the target object. Specifically, the next object adjacent to the target object can be a next video, a next picture, a next page of a document or the like. When the next object is a video, a playback operation is performed on a next video. When the next object is a picture, a viewing operation is performed. When the shape of the movement track matches the less-than symbol pattern, the corresponding operation is performed on a previous object adjacent to the target object. The previous object adjacent to the target object can be a previous video, a previous picture, a previous page of a document or the like. Specifically, the movement track similar to a circle can control whether a target interface is paused or not, the cross-shaped pattern can control whether the target interface is closed or not, and the greater-than or less-than symbol pattern can control an application to select a previous object or a next object. Conforming to basic operation types is convenient for the user to operate efficiently. In the gesture interaction method with the fixed track using a single laser controller provided by the present embodiment, the movement track is generated according to the movement of the at least one laser cursor. When the track is a fixed track, the matching degree is obtained by comparing the movement track with the at least one preset pattern. When a preset matching range is satisfied, the corresponding interaction operation is realized. The laser operation track performed by the user meets rules of common touch operations and conforms to the user's cognitive habits, thereby reducing learning costs. Furthermore, the content can be positioned accurately through the laser signal. Accuracy and sensitivity of the controlled content are enhanced, thereby realizing high-efficient, convenient, and accurate interactions in a long distance and a short distance.

Figure 5:
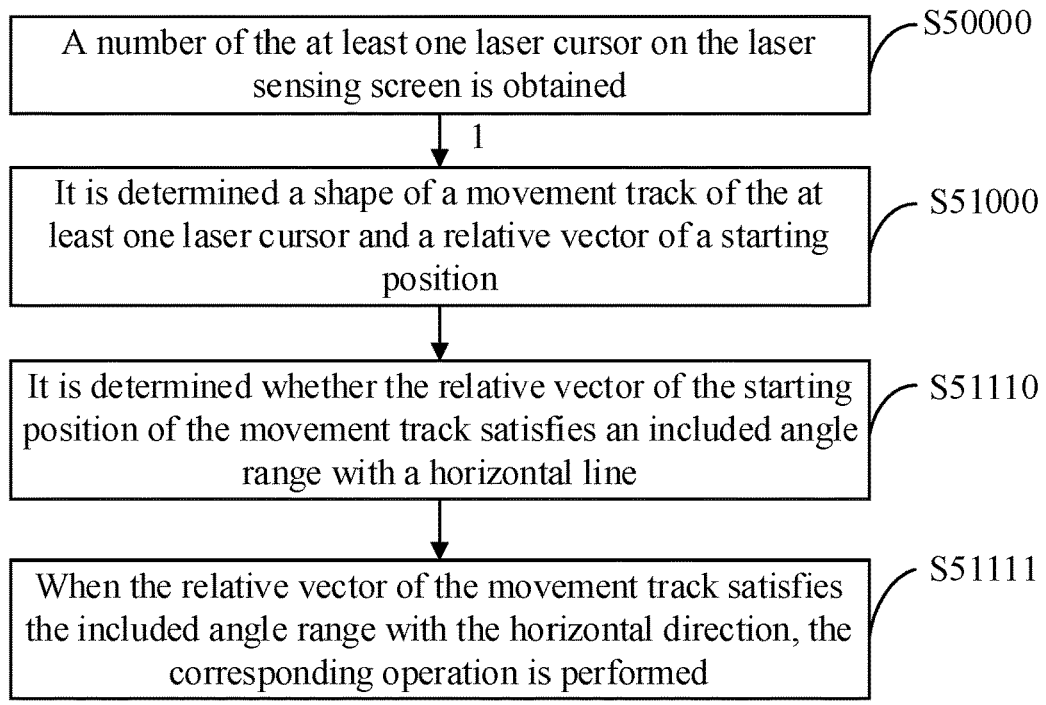
FIG. 5 illustrates a logic flow diagram of a gesture interaction of a relative vector of a starting position of a movement track in an interaction method provided by the present disclosure.

Further, referring to FIG. 5, a logic flow diagram of a gesture interaction of a relative vector of a starting position of a movement track in an interaction method is provided by the present disclosure. Based on the embodiment shown in FIG. 4, performing the corresponding operations according to the shape of the movement track or the relative vector of the starting position further includes the following steps.

In step S51110, it is determined whether the relative vector of the starting position of the movement track satisfies an included angle range with a horizontal line.

In step S51111, when the relative vector of the movement track satisfies the included angle range with the horizontal direction, the corresponding operation is performed.

In the present embodiment, in a condition that the position of the at least one laser cursor is in the non-interactive control area and the movement track of the at least one laser cursor does not match the at least one preset pattern, it is determined the relative vector of the starting position generated by the movement track of the at least one laser cursor. The relative vector can include a leftward vector, an upward or downward vector, and a rightward vector, and thus a return operation, an up or down scrolling operation, and a rightward scrolling operation are correspondingly performed according to the specific relative vectors. A specific direction can be determined according to the included angle range between the relative vector and the horizontal direction. Different functions are displayed in different scenarios according to the different sliding directions. Specifically, when the included angle between the relative vector of the movement track and the horizontal line is within [A, B] or [E, F], a right slide operation is performed. When the included angle between the relative vector of the movement track and the horizontal line is within (B, C), an upward slide operation is performed. When the included angle between the relative vector of the movement track and the horizontal line is within [C, D], a left slide operation is performed. When the included angle between the relative vector of the movement track and the horizontal line is within (D, E), a downward slide operation is performed. It should be noted that $0° \leq A < B < C < D < E < F \leq 360°$.

Specifically, in normal situations, a preset included angle range corresponding to the right slide operation is within [0°, 45°] or [315°, 360°]. For example, when the relative vector of the at least one laser cursor is 40 degrees, the right slide operation is performed. In a picture application, a picture which is not previewed can be viewed by scrolling to the right. Alternatively, in an application displayed in a landscape page, a page with the same level can be viewed by scrolling to the right.

In normal situations, a preset included angle range corresponding to the upward slide operation is within (45°, 135°). For example, when the relative vector angle of the at least one laser cursor is 90 degrees, the upward slide operation is performed.

In normal situations, a preset included angle range corresponding to the downward slide operation is within (225°, 315°). For example, when the relative vector angle of the at least one laser cursor is 270 degrees, the downward slide operation is performed. Furthermore, when the upward operation or the downward operation is performed, functions, such as moving up or down page content and turning a page, can be realized. For example, when information on a vertical page is browsed (corresponding to browsing a page by a mobile phone), the page can be scrolled up and down or turned by the upward slide function or the downward slide function.

In normal situations, a preset included angle range corresponding to the left slide operation is within [135°, 225°]. For example, when the relative vector angle of the at least one laser cursor is 220 degrees, the left slide operation is performed. When the left slide operation is performed, a function of returning content in a scenario to a higher level is realized. For example, in a television program application, one of variety shows is selected after entering a variety show page according to categories. When it is desired to change to a television drama, it is necessary to perform the left slide operation to return content of a screen interface to a higher level, thereby realizing the purpose of selecting the television drama.

In addition, in order to further comply with a user operating system, the relationship of the included angles can be: $0° \leq A < B < C < D < E < F \leq 360°$. Those skilled in the art can understand that each included angle range corresponding to each operation can be changed according to specific situations.

In the gesture interaction method provided by the present embodiment, when the position of the at least one laser cursor is in the non-interactive control area, the information of the relative vector of the at least one laser cursor projected on the sensing screen by the emission device is determined to match the corresponding control operation. As such, a specific operation can be performed on specific content. The laser operation track performed by the user meets rules of common touch operations and conforms to the user's cognitive habits, thereby reducing learning costs. Furthermore, the content can be positioned accurately through the laser signal. Accuracy and sensitivity of the controlled content are enhanced, thereby realizing high-efficient, convenient, and accurate interactions in a long distance and a short distance.

In addition, in a normal operation application scenario, the gesture interaction method is responded first. In an air drawing App, a drawing operation is performed in response to a basic slide interaction. In a specific application such as browsing video content, a gesture slide interaction is responded first. In other applications, a track operation is responded.

Further, based on FIG. 4, a zoom-in interaction or a zooming-out interaction in an interaction method is provided by an embodiment of the present disclosure. Obtaining the number of the at least one laser cursor on the laser sensing screen further includes the following step.

In step S52000, when the number of the at least one laser cursor is two or more, changes of two of the at least one laser cursor with largest laser cursor vector changes are selected to perform the corresponding operation.

In the present embodiment, the display device obtains the number of the at least one laser cursor on the laser sensing screen. The display device can realize laser signals emitted by multiple emission devices. When the number of the received laser cursors is more than two, the changes of the two of the at least one laser cursor with the largest laser cursor vector changes are obtained by comparison and served as carriers of determining a gesture interaction to perform the corresponding operation. For example, vector changes generated by relative position changes of the at least one laser cursor are determined and obtained. Changes of two of the at least one laser cursor with largest vector changes are selected and served as carriers of an interaction control. When a distance between the two laser cursors gradually decreases (for example, when the two laser cursors move towards each other), a zoom-out operation is performed to realize a dynamic zoom-out function of content. When the distance between the two laser cursors gradually increases (for example, when the two laser cursors move away from each other), a zoom-in operation is performed to realize a dynamic zoom-in function of content.

In the zoom-in or zoom-out interaction method provided by the present embodiment, in the control of multiple laser controllers, the changes of the two of the at least one laser cursor with the largest laser cursor vector changes are obtained by comparison and served as the carriers of the gesture movement interaction. The zoom-in or zoom-out operation interaction is performed by determining a change value of a distance of a relative position of the two laser cursors. The laser operation performed by the user meets rules of common touch operations and conforms to the user's cognitive habits, thereby reducing learning costs. Furthermore, the content can be positioned accurately by the laser signal. Accuracy and sensitivity of the controlled content are enhanced, thereby realizing high-efficient, convenient, and accurate interactions in a long distance and a short distance.

Further, based on the embodiments shown in FIG. 2 to FIG. 6, performing the corresponding operation according to the operation information and the position information of the at least one laser cursor includes the following step.

A preset shape corresponding to a laser spot is operated to be displayed on the laser sensing screen operation, and content on the laser sensing screen of the display device is controlled to perform the corresponding operation.

In the present embodiment, shapes of different laser spot are set when different operation interactions are performed. Accordingly, a state of a current laser operation can be accurately and intuitively known, and a real-time operation and visual feedback for the user can be realized.

Further, based on the embodiments shown in FIG. 2 to FIG. 6, performing the corresponding operation according to the operation information and the position information of the at least one laser cursor includes the following step.

Feedback information is transmitted to the emission device in a vibration signal after the corresponding operation is completed, so that the user perceives an operation result.

A tactile feedback interaction is provided by the present embodiment. After the operation is completed, a complete signal is transmitted in the vibration signal through an original signal receiving channel, so as to realize the purpose of transmitting tactile feedback of interactive information to the user in real time.

In addition, relevant sound effect feedback can be preset in the display device. After the execution of the display device is completed, the user can be clearly informed of a current execution situation to facilitate execution of a subsequent operation.

In addition, the feedback signal can also be generated when there is an error in the execution or the execution does not match a preset execution, the user can perceive the problem through the feedback vibration signal, so as to realize real-time feedback and improve accuracy of a user's interaction in laser sensing.

Figure 7:
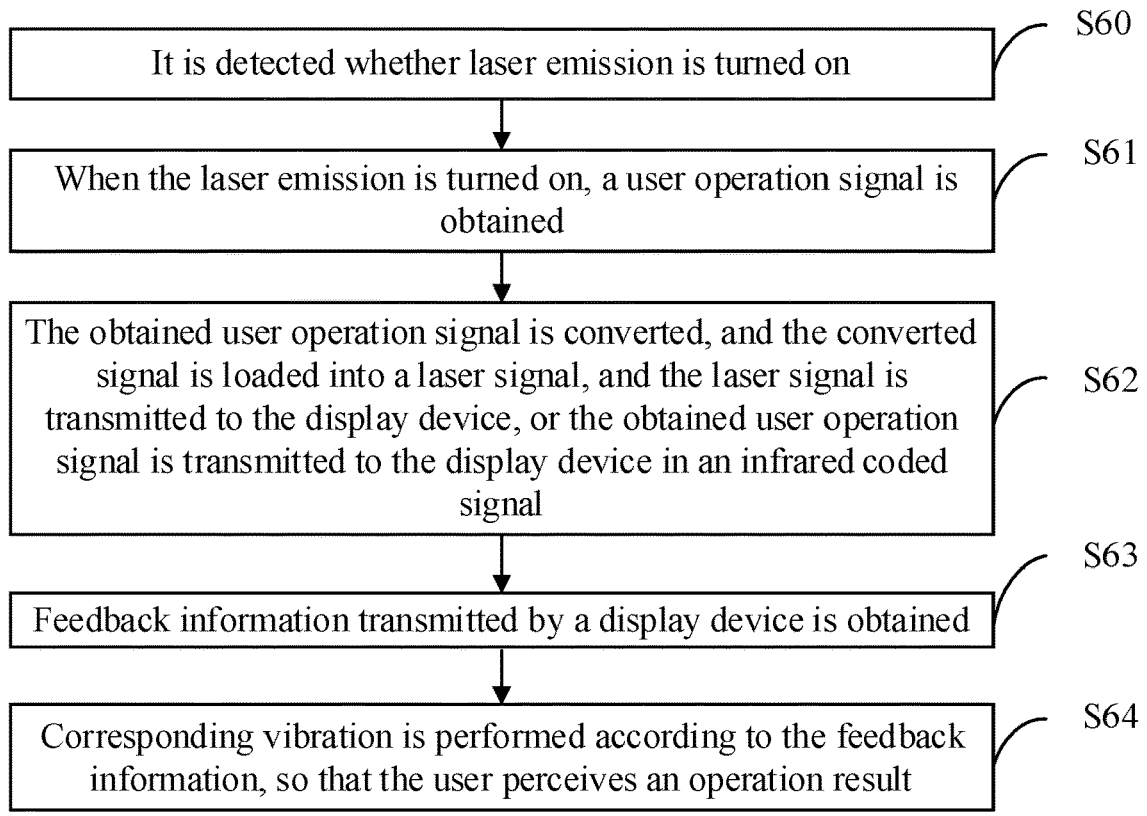
FIG. 7 illustrates a logic flow diagram of an interaction method based on an emission device provided by the present disclosure.

Further, referring to FIG. 7, a logic flow diagram of an interaction method based on an emission device is provided by the present disclosure and applied to the emission device. The method includes the following steps.

In step S60, it is detected whether laser emission is turned on.

In step S61, when the laser emission is turned on, a user operation signal is obtained.

In step S62, the obtained user operation signal is converted, and the converted signal is loaded into a laser signal, and the laser signal is transmitted to the display device, or the obtained user operation signal is transmitted to the display device in an infrared coded signal.

In the present embodiment, the user operation signal is obtained, and the user signal is transmitted. The transmitted operation signal is converted into an electrical signal by a receiving module in the emission device, and then the electrical signal is re-encoded to load the operation signal into the laser signal. Accordingly, the user operation signal can be transmitted through the laser. The transmitted operation signal includes a single-click operation, a double-click operation, or a long-press operation.

The transmission of the operation signal also includes the following steps. The operation signal is converted into an electrical signal by the receiver of the emission device first. Then, the electrical signal is encoded and modulated by infrared modulation or wireless frequency modulation or amplitude modulation. The encoded and modulated signal is converted into a wireless signal and then transmitted. The transmitted operation signal includes a single-click operation, a double-click operation, or a long-press operation.

In the interaction method based on the emission device provided by the present embodiment, after the laser controller is turned on, the operation signal is transmitted through a physical key of the controller. The operation signal is transmitted after being loaded into a light signal by data encoding, or the operation signal is transmitted through a wireless infrared signal. The operation signal and the change of the operation information are transmitted, according to the change of the spatial position information of the emission device and the button operation, to the display device in real time, thereby realizing the corresponding interaction operation.

Further, based on FIG. 7, a method for receiving feedback information of a laser interactive operation is provided by the present disclosure. The method includes the following steps.

In step S63, feedback information transmitted by a display device is obtained.

In step S64, corresponding vibration is performed according to the feedback information, so that the user perceives an operation result.

In the laser interactive feedback method provided by the present embodiment, the feedback information of the display device is received by a sensing and receiving module of the emission device. After data encoding, the received feedback information is transmitted, in the vibration signal, to the control button of the emission device, thereby realizing the purpose of transmitting the feedback information to the user.

Specific embodiments of a computer-readable storage medium of the present disclosure are basically the same as the embodiments of the above-mentioned interaction methods and are not repeated herein.

It should be noted that the terms "include", "contain", or their any other variants are intended to cover a non-exclusive inclusion, so that a process, a method, a product, or a system that includes a list of elements not only includes those elements but also includes other elements which are not expressly listed, or further includes elements inherent to such process, method, product, or system. Without more constraints, an element preceded by "includes a . . . " does not preclude the existence of additional identical elements in the process, method, product, or system that includes the element.

The sequence numbers of the above-mentioned embodiments of the present disclosure are merely for description purpose and do not indicate the preference of the embodiments.

According to the above-mentioned descriptions of implementations, those skilled in the art can clearly understand that the methods according to the above-mentioned embodiments may be implemented by using software and a necessary general hardware platform, or may be implemented by using hardware. However, in some cases, the former may a better implementation. Based on such an understanding, all or at least a part of the technical solutions in the present disclosure may be implemented in the form of a software product. The computer software product is stored in a storage medium (such as a ROM/RAM, a magnetic disk, or an optical disc), and includes several instructions for instructing an emission device/display device (which may be a mobile phone, a laser pen, a laser controller, a computer, a device having a laser sensing screen, a laser sensing interaction device or the like) to perform the methods described in the embodiments of the present disclosure.

The above-mentioned descriptions are merely preferred embodiments of the present disclosure, but are not intended to limit the patent scope of the present disclosure. Any equivalent structure or equivalent flow transformation made by using the specification and the content of the drawings of the present disclosure, or direct or indirect applications to other related technical field should be included in the patent protection scope of the present disclosure.

What is claimed is:

1. An interaction method, for a display device, the method comprising:
   receiving a laser signal emitted by an emission device, wherein the laser signal is displayed on a laser sensing screen of the display device in at least one laser cursor;
   obtaining position information of the at least one laser cursor on the laser sensing screen;
   obtaining operation information transmitted by the emission device; and
   performing a corresponding operation according to the operation information and the position information of the at least one laser cursor;
   wherein the laser sensing screen comprises an interactive control area and a non-interactive control area, and the interaction method further comprises:
   performing a drag operation, when the at least one position of the at least one laser cursor is in the interactive control area; and
   performing a slide operation, when the at least one position of the at least one laser cursor is not in the interactive control area; and
   wherein before the performing the slide operation, the interaction method further comprises:
   obtaining a number of the at least one laser cursor on the laser sensing screen;
   determining a shape of a movement track of the at least one laser cursor and a relative vector of a starting position, when the number of the at least one laser cursor is 1; and
   performing the corresponding operation according to the shape of the movement track of the at least one laser cursor or the relative vector of the starting position.

2. The interaction method of claim 1, wherein the obtaining the operation information transmitted by the emission device comprises:
   analyzing the laser signal to obtain an operation signal transmitted by the emission device.

3. The interaction method of claim 1, wherein the obtaining the operation information transmitted by the emission device comprises:
   receiving an operation signal transmitted by the emission device.

4. The interaction method of claim 1, wherein the performing the corresponding operation according to the operation information and the position information of the at least one laser cursor comprises:
   determining whether duration of a first single-time operation in the operation information exceeds a first preset time;

determining whether adjacent second single-time operation information is obtained within a second preset time of the first single-time operation, when the duration of the first single-time operation does not exceed the first preset time;

performing a double-click operation, when the adjacent second single-time operation information is obtained within the second preset time of the first single-time operation; and performing a single-click operation, when the adjacent second single-time operation information is not obtained within the second preset time of the first single-time operation.

5. The interaction method of claim 4, wherein the determining whether the duration of the first single-time operation in the operation information exceeds the first preset time further comprises:

determining whether the position information of the at least one laser cursor is changed, when the duration of the operation information exceeds the first preset time;

performing a long-press operation, when the position information of the at least one laser cursor is not changed; and determining whether at least one position of the at least one laser cursor is in the interactive control area, when the position information of the at least one laser cursor is changed.

6. The interaction method of claim 1, wherein the performing the corresponding operation according to the shape of the movement track of the at least one laser cursor or the relative vector of the starting position comprises:

determining a matching degree between the shape of the movement track of the at least one laser cursor and at least one preset pattern; and determining that the shape of the movement track matches the at least one preset pattern and performing the corresponding operation, when the matching degree between the shape of the movement track and the at least one preset pattern is greater than a preset matching threshold.

7. The interaction method of claim 6, wherein the at least one preset pattern comprises a circular pattern, a cross pattern, a greater-than symbol pattern, and a less-than symbol pattern, and the determining that the shape of the movement track matches the at least one preset pattern comprises:

performing a pause operation on a target object, when the shape of the movement track matches the circular pattern;

performing a closing operation on the target object, when the shape of the movement track matches the cross pattern;

performing the corresponding operation on a next object adjacent to the target object, when the shape of the movement track matches the greater-than symbol pattern; and performing the corresponding operation on a previous object adjacent to the target object, when the shape of the movement track matches the less-than symbol pattern.

8. The interaction method of claim 1, wherein the performing the corresponding operation according to the shape of the movement track of the at least one laser cursor or the relative vector of the starting position comprises:

determining whether the relative vector of the starting position of the movement track satisfies an included angle range with a horizontal line; and performing the corresponding operation, when the relative vector of the movement track satisfies the included angle range with the horizontal line.

9. The interaction method of claim 8, wherein when the relative vector of the movement track satisfies the included angle range with the horizontal line, the performing the corresponding operation comprises:

performing a right slide operation, when an included angle between the relative vector of the movement track and the horizontal line is within [A, B] or [E, F];

performing an upward slide operation, when the included angle between the relative vector of the movement track and the horizontal line is within (B, C);

performing a left slide operation, when the included angle between the relative vector of the movement track and the horizontal line is within [C, D]; and performing a downward slide operation, when the included angle between the relative vector of the movement track and the horizontal line is within (D, E), wherein $0°≤A<B<C<D<E<F≤360°$.

10. The interaction method of claim 1, wherein after the obtaining the number of the at least one laser cursor on the laser sensing screen, the interaction method further comprises:

selecting changes of two of the at least one laser cursor with largest laser cursor vector changes to perform the corresponding operation, when the number of the at least one laser cursor is two or more.

11. The interaction method of claim 10, wherein the selecting the changes of the two of the at least one laser cursor with the largest laser cursor vector changes to perform the corresponding operation comprises:

performing a zoom-out operation, when a distance between the two of the at least one laser cursor gradually decreases; and performing a zoom-in operation, when the distance between the two of the at least one laser cursor gradually increases.

12. The interaction method of claim 1, wherein the laser signal comprises a laser spot, and the performing the corresponding operation according to the operation information and the position information of the at least one laser cursor comprises:

operating a preset shape corresponding to the laser spot to be displayed on the laser sensing screen, and controlling content on the laser sensing screen of the display device to perform the corresponding operation.

13. The interaction method of claim 1, wherein after the performing the corresponding operation according to the operation information and the position information of the at least one laser cursor, the interaction method further comprises:

transmitting feedback information to the emission device in a vibration signal after the corresponding operation is completed, so that a user perceives an operation result.

14. A display device, wherein the display device comprises an interactive program, and the interactive program is configured to implement:

receiving a laser signal emitted by an emission device, wherein the laser signal is displayed on a laser sensing screen of the display device in at least one laser cursor;

obtaining position information of the at least one laser cursor on the laser sensing screen;

obtaining operation information transmitted by the emission device; and performing a corresponding operation according to the operation information and the position information of the at least one laser cursor;

wherein the laser sensing screen comprises an interactive control area and a non-interactive control area, and the interactive program is further configured to implement:

performing a drag operation, when the at least one position of the at least one laser cursor is in the interactive control area; and performing a slide operation, when the at least one position of the at least one laser cursor is not in the interactive control area; and wherein before the performing the slide operation, the interaction method further comprises:

obtaining a number of the at least one laser cursor on the laser sensing screen;

determining a shape of a movement track of the at least one laser cursor and a relative vector of a starting position, when the number of the at least one laser cursor is 1; and performing the corresponding operation according to the shape of the movement track of the at least one laser cursor or the relative vector of the starting position.

15. The display device of claim 14, wherein the performing the corresponding operation according to the operation information and the position information of the at least one laser cursor comprises:

determining whether duration of a first single-time operation in the operation information exceeds a first preset time;

determining whether adjacent second single-time operation information is obtained within a second preset time of the first single-time operation, when the duration of the first single-time operation does not exceed the first preset time;

performing a double-click operation, when the adjacent second single-time operation information is obtained within the second preset time of the first single-time operation; and performing a single-click operation, when the adjacent second single-time operation information is not obtained within the second preset time of the first single-time operation.

16. The display device of claim 15, wherein the the determining whether the duration of the first single-time operation in the operation information exceeds the first preset time further comprises:

determining whether the position information of the at least one laser cursor is changed, when the duration of the operation information exceeds the first preset time;

performing a long-press operation, when the position information of the at least one laser cursor is not changed; and determining whether at least one position of the at least one laser cursor is in the interactive control area, when the position information of the at least one laser cursor is changed.

17. The display device of claim 14, wherein the performing the corresponding operation according to the shape of the movement track of the at least one laser cursor or the relative vector of the starting position comprises:

determining a matching degree between the shape of the movement track of the at least one laser cursor and at least one preset pattern; and determining that the shape of the movement track matches the at least one preset pattern and performing the corresponding operation, when the matching degree between the shape of the movement track and the at least one preset pattern is greater than a preset matching threshold.

18. A non-transitory storage medium, wherein the non-transitory storage medium comprises an interactive program, and the interactive program is executed by a processor to implement:

receiving a laser signal emitted by an emission device, wherein the laser signal is displayed on a laser sensing screen of the display device in at least one laser cursor;

obtaining position information of the at least one laser cursor on the laser sensing screen;

obtaining operation information transmitted by the emission device; and performing a corresponding operation according to the operation information and the position information of the at least one laser cursor;

wherein the laser sensing screen comprises an interactive control area and a non-interactive control area, and the interactive program is further executed by the processor to implement:

performing a drag operation, when the at least one position of the at least one laser cursor is in the interactive control area; and performing a slide operation, when the at least one position of the at least one laser cursor is not in the interactive control area; and wherein before the performing the slide operation, the interaction method further comprises:

obtaining a number of the at least one laser cursor on the laser sensing screen;

determining a shape of a movement track of the at least one laser cursor and a relative vector of a starting position, when the number of the at least one laser cursor is 1; and performing the corresponding operation according to the shape of the movement track of the at least one laser cursor or the relative vector of the starting position.

* * * * *